(12) United States Patent
Picard et al.

(10) Patent No.: US 7,370,769 B2
(45) Date of Patent: May 13, 2008

(54) HOIST FOR RETRIEVING AND LIFTING LOADS

(76) Inventors: Richard Picard, 45 and 47 rang des Jumeaux-Pelletier, Saint-Aubert, Quebec (CA) G0R 2R0; Stéphane Couture, 22, rue des Érables, Saint-Aubert, Quebec (CA) G0R 2R0

( * ) Notice: Subject to any disclaimer, the term of this patent is extended or adjusted under 35 U.S.C. 154(b) by 192 days.

(21) Appl. No.: 11/410,088

(22) Filed: Apr. 25, 2006

(65) Prior Publication Data

US 2007/0246436 A1    Oct. 25, 2007

(51) Int. Cl.
*B66C 23/68*   (2006.01)

(52) U.S. Cl. .......................... 212/292; 212/299

(58) Field of Classification Search ............... 212/292, 212/299, 300
See application file for complete search history.

(56) References Cited

U.S. PATENT DOCUMENTS

| | | | | |
|---|---|---|---|---|
| 2,782,940 A | * | 2/1957 | Beseler | 414/543 |
| 2,841,960 A | * | 7/1958 | Holan et al. | 91/529 |
| 3,308,611 A | * | 3/1967 | Barber | 56/10.3 |
| 3,556,226 A | * | 1/1971 | Brewer et al. | 172/130 |
| 3,653,193 A | * | 4/1972 | Coughran, Jr. | 56/10.7 |
| 3,819,059 A | * | 6/1974 | Mantel | 212/300 |
| 4,141,591 A | * | 2/1979 | Spicer | 298/17.6 |
| 4,597,498 A | * | 7/1986 | Spinosa et al. | 212/303 |
| 5,445,487 A | | 8/1995 | Koscinski, Jr. | |
| 5,758,785 A | * | 6/1998 | Spinosa et al. | 212/300 |
| 5,853,282 A | * | 12/1998 | Bechler et al. | 414/543 |
| 6,071,065 A | * | 6/2000 | Zackovich | 414/563 |

* cited by examiner

Primary Examiner—Thomas J. Brahan
(74) Attorney, Agent, or Firm—Ogilvy Renault LLP

(57) ABSTRACT

A hoist for retrieving, lifting and positioning a light load of up to about 1000 lbs, is described. The hoist comprises a boom support column having an attaching lower end and a boom support upper end. The boom support upper end has a boom assembly connector and a transverse support surface. The boom assembly has a connecting support wall and a lower projecting connector for rotational connection with the boom assembly connector for maintaining the boom at an upward angular position. A releasable locking mechanism locks the boom at the upward angular position. A boom actuating brake arrests rotational displacement between the connecting support wall and the transverse support surface when the boom is at a substantially horizontal load retrieving position. A pulley is rotatably secured to an axle secured at a free end of the boom. The pulley is adapted to guide a cable thereon through a cable guide linkage to align and maintain the cable on the pulley. The pulley is supported on an axle which is connected to a lateral pivot support.

20 Claims, 13 Drawing Sheets

HOIST FOR RETRIEVING AND LIFTING LOADS

TECHNICAL FIELD

The present invention relates to a hoist for retrieving, lifting and positioning light loads in the range of up to about 1000 lbs and wherein the hoist can be operated by a single person in a secure manner and capable of retrieving loads from different directions without having to displace the boom assembly.

BACKGROUND ART

Various types of light hoisting mechanisms are known for securement to lightweight vehicles such as panel trucks, tractors, and even all terrain vehicles for lifting small loads below 1000 lbs.

Reference is made to U.S. Pat. No. 5,445,487 to illustrate a typical example of the construction of such lightweight hoists. There are several disadvantages with these hoist structures. A main disadvantage is that the lifting cable, which is positioned about the pulley secured at the top end of the boom, often will jump the pulley during operation if the load is disposed sideways of the pulley exerting a lateral pulling force on the cable. This often leads to damage and considerable downtime for repair. It also presents a danger to the operator. Another disadvantage of these hoists is that they are often incapable of pulling loads which are disposed at a distance from the hoist and often at an angle to the hoist. Although some of these hoists are provided with boom angle adjustments, these adjustments are mechanical and require a resetting each time the boom has to be disposed at a different angle.

A still further disadvantage of known lightweight booms is that often these booms are freely rotatable on their support axis and when dragging or lifting a load the boom may suddenly rotate on its support swinging the load and causing injury to personnel or to equipment in the vicinity of the boom. The load being lifted or retrieved by the hoist also often will cause the boom support to bend or break due to excessive loading and this is also hazardous.

A still further disadvantage of these lightweight booms is that they cannot be disassembled quickly to form a small transport package for ease of transportation. They are also time consuming to install on a vehicle or on a support frame and often require special brackets.

SUMMARY OF THE INVENTION

It is therefore a feature of the present invention to provide a hoist for retrieving and lifting small loads and which substantially overcomes the above-mentioned disadvantages of the prior art.

Another feature of the present invention is to provide a hoist wherein the boom can be immovably connected at an upright angular position for lifting a load while at the same time being arrested at that position.

Another feature of the present invention is to provide a hoist wherein the boom can be lowered to a substantially horizontal load retrieving position and automatically lock to prevent angular displacement and wherein the boom can be disposed at several angles allowing a large arc of working positions with respect to the boom support frame.

Another feature of the present invention is to provide a hoist wherein that boom is automatically positioned at a hoisting position and can be locked at a desired angle to provide added safety.

Another feature of the present invention is to provide a hoist wherein the pulley of the boom is pivotally mounted and provided with a cable guide assembly which prevents the cable from jumping the pulley, particularly when pulling loads laterally of the boom.

According to the above features, from a broad aspect, the present invention provides a hoist for retrieving, lifting and positioning a load. The hoist comprises a boom support column having an attaching lower end and a boom support upper end. The boom support upper end has a boom assembly connecting means and a transverse support surface. The boom assembly has a connecting support wall and a lower projecting connector for rotational connection with the connecting means with the connecting support wall in registry with the transverse support surface. A boom is pivotally secured to the connecting support wall. Biasing means is provided for maintaining the boom at an upward angular position. Releasable locking means is provided to lock the boom at the upward angular position. Boom actuating brake means arrests rotational displacement between the connecting support wall and the transverse support surface when the boom is at a substantially horizontal load retrieving position. A pulley is rotatably secured to an axle secured to a free end of the boom. The pulley is adapted to guide a cable thereon. Cable guide means is provided to align and maintain the cable on the pulley. The axle of the pulley is also connected to a lateral pivot support.

BRIEF DESCRIPTION OF THE DRAWINGS

A preferred embodiment of the present invention will now be described with reference to the accompanying drawings in which.

DESCRIPTION OF PREFERRED EMBODIMENTS

Figure 1A:
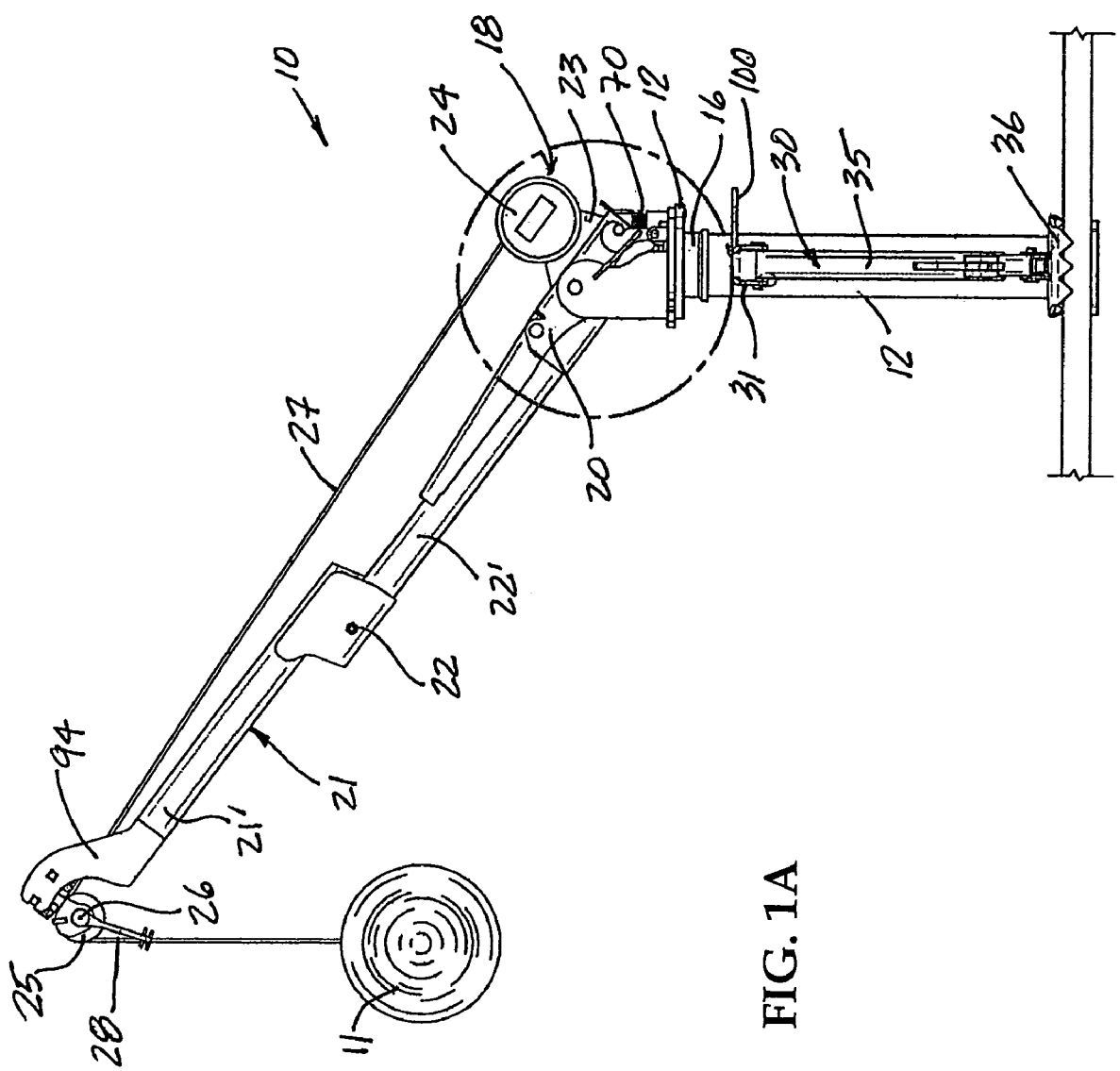
FIGS. 1A and 1B are sides view illustrating the construction of the hoist of the present invention and wherein the boom is herein shown at an upward angular load lifting position and at a horizontal load pulling position.
Figure 1B:
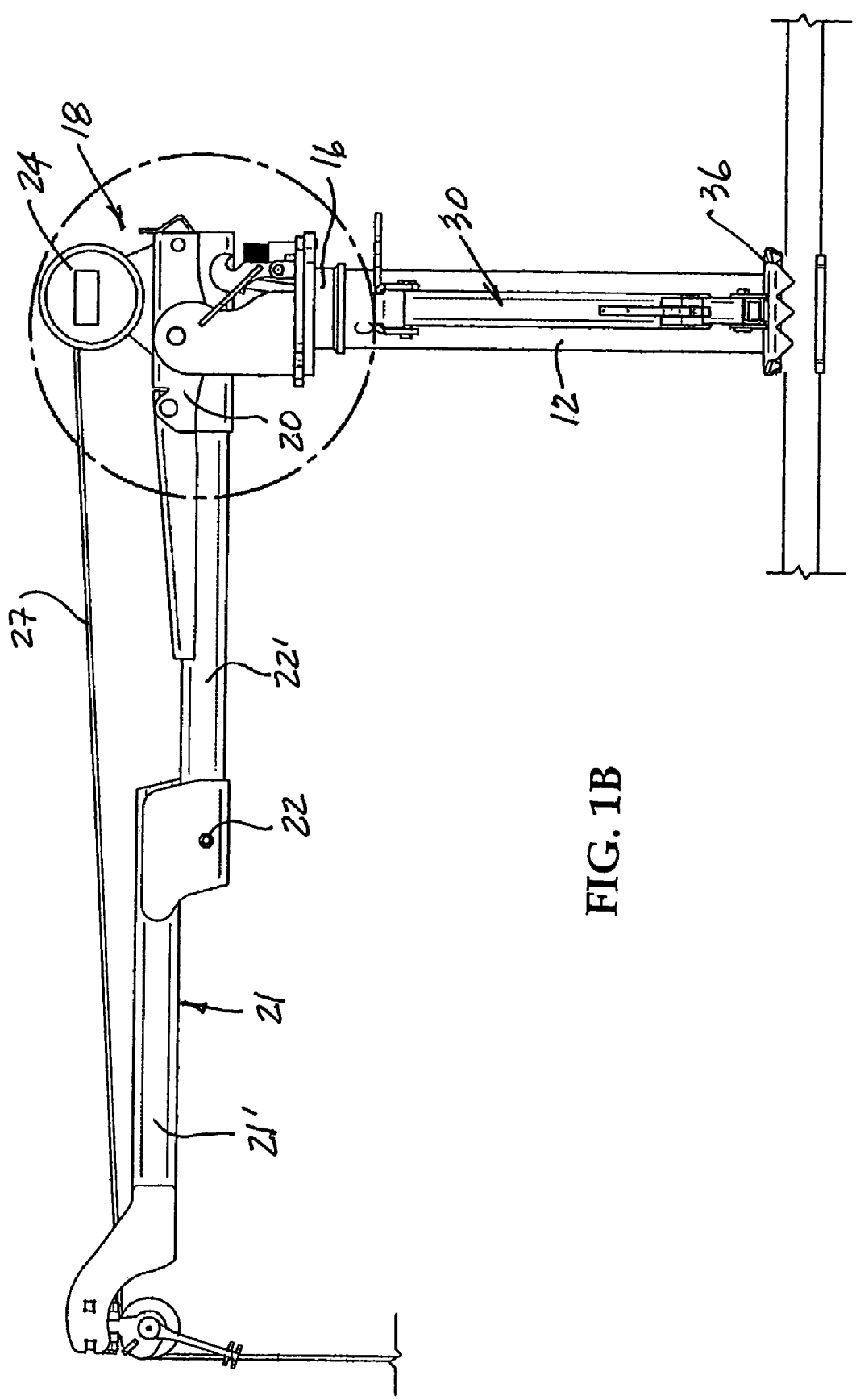
Figure 3:
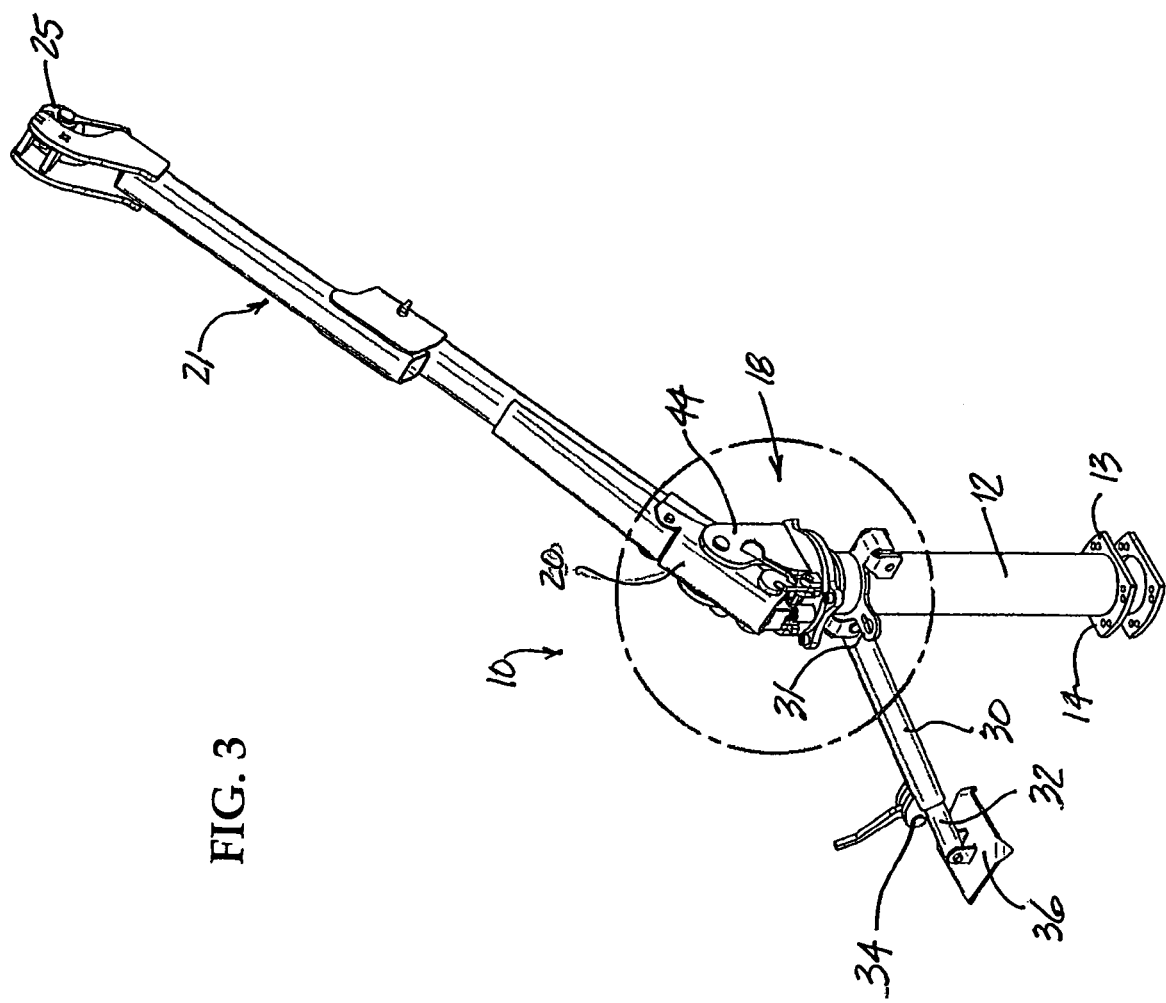
FIG. 3 is a perspective view showing the construction of the hoist of the present invention showing the disposition between the boom, the support column and the telescopic brace leg.

Referring now to the drawings and more particularly to FIGS. 1A, 1B and 3, there is shown generally at 10 a hoist constructed in accordance with the present invention and particularly adapted for retrieving a load, such as the log 11 far away from the hoist and in various directions thereto, lifting the retrieved load and positioning the load at a desired position adjacent the hoist, such as on a trailer (not shown). The hoist comprises a boom support column 12 which is provided with an attaching lower end 13 which is herein constituted by an attachment plate 14, adapted to receive fastening means, such as bolts, whereby to clamp the boom support column 12 to a stationary support member such as a trailer frame 15 herein shown in phantom line. The attachment plate 14 could also be connected to a hitch attachment at the rear end of a pick-up truck, a tractor vehicle, or an all terrain vehicle. The boom of the present invention is adapted to support small loads in the range of up to about 1000 lbs and to effectively maneuver these loads by a single operator person.

The boom support column 12 is also provided with a boom support upper end 16 which is provided with a boom support assembly connecting flange 17 whereby to connect the boom assembly 18 thereto. This connecting flange 17 is provided with a flat transverse upper support surface 19 as will be described later.

The boom support assembly 18 is provided with a boom attaching cylinder 20 to which is connected a boom assembly 21. As herein shown the boom assembly 21 has two boom sections detachably connected to one another by a connecting pin element 22. A winch attachment bracket 23 is provided to secure a winch 24 thereto. The free end 21$^1$ of the boom assembly 21 is provided with attachment flanges 94 to which is hingedly secured a pulley 25 which is rotatably secured to an axle 26. The pulley 25 is adapted to guide a cable 27 thereon. A cable guide member 28 is pivotally connected about the axle 26 and guides the cable 27 therethrough whereby to maintain the cable aligned with the trough 25$^1$ of the pulley 25, as will be described later.

Figure 7:
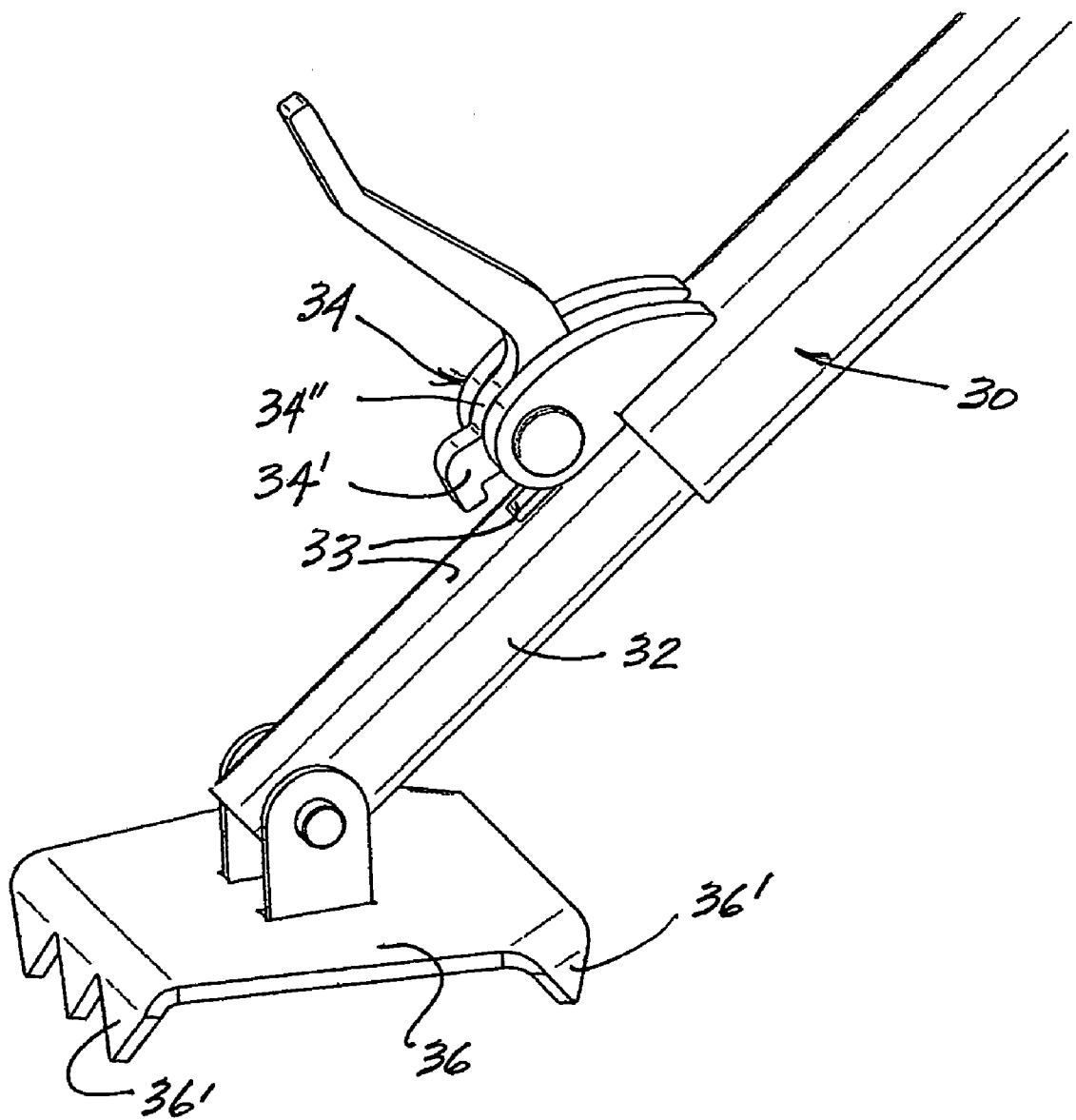
FIG. 7 is a fragmented perspective view showing the construction of the telescopic brace leg.

As shown in FIG. 7 a telescopic bracing leg 30 is pivotally connected at a pivot connection 31$^1$ of a U-shaped connector 31 secured to the boom support column 12. The brace leg 30 has a telescoping lower tubular portion 32 which is provided with incremental connecting formations 33, herein equidistantly spaced holes. A lever actuated arresting locking member 34 is secured to the upper arm 35 of the telescoping bracing leg 30 and is provided with an arresting pin 34$^1$ for locking engagement with a selected one of the connecting formations 33. The locking member 34 has an eccentric body 32$^{11}$ to provide wedging between the leg 30 hollow member and the lower tubular position 32. A ground engaging foot plate 36 is hingedly connected at a lower end of the lower tubular portion 32 and provided with ground engaging formation 36$^1$ for engagement on a ground surface.

Referring now to FIGS. 2, 4, 5, 6A and 6B there will be described the construction of the boom support assembly 18. As herein shown the boom support assembly 18 is provided with a connecting support wall in the form of a flat metal disk 40 having a bottom flat surface 41 and integrally formed peripheral shoulders 42, see FIG. 4, for abutment with limit pins 43 and 43$^1$ projecting above the flat top surface 17$^1$ of the boom assembly connecting flange 17. These limit pins 43 and 43$^1$ limit arcuate displacement of the boom assembly 18 within an angular range with respect to the boom support column 12.

The boom attaching cylinder 20 is pivotally secured between a pair of flanges 44, projecting above the connecting support wall 40, on a boom pivot pin 45. The boom pivot pin 45 extends through the boom attaching cylinder 20 and abuts over a notch end 46, see FIG. 6, of the lower boom tubular member 22$^1$ to provide a solid interconnection with the boom attaching cylinder 20 against the load lifted by the boom. The boom assembly 21 is maintained at an upward angular position, as shown in FIG. 1, by a biasing means which is constituted by a connecting rod 47 pivotally connected on pivot 48 to a rear end 49 of the boom attaching cylinder 20 and rearwardly spaced from the boom pivot pin 45, as clearly illustrated in FIG. 6. A coil spring 50 is retained in a compression state about the connecting rod 47 between an arresting cylinder connector 51 secured to an inner surface of a projecting threaded connector 52 which is secured to the flat disk 40 and projects thereunder. This arresting cylinder connector 51 is immovable with respect to the threaded connector 52. An adjustable threaded nut 53 and a washer 54 combination, maintains the coil spring 50 in compression and by threading the nut the compression of the spring can be adjusted whereby to pull on the boom rear end 49 until it reaches its upward angular position, as shown in FIG. 1. Accordingly, the coil spring 50 exerts a pulling force on the boom rear end to maintain the boom at an upward angular position. This connecting rod 47 and coil spring 50 assembly projects inside the boom support column 12 which is a hollow steel column, as clearly illustrated in FIGS. 6A and 6B.

Figure 2:
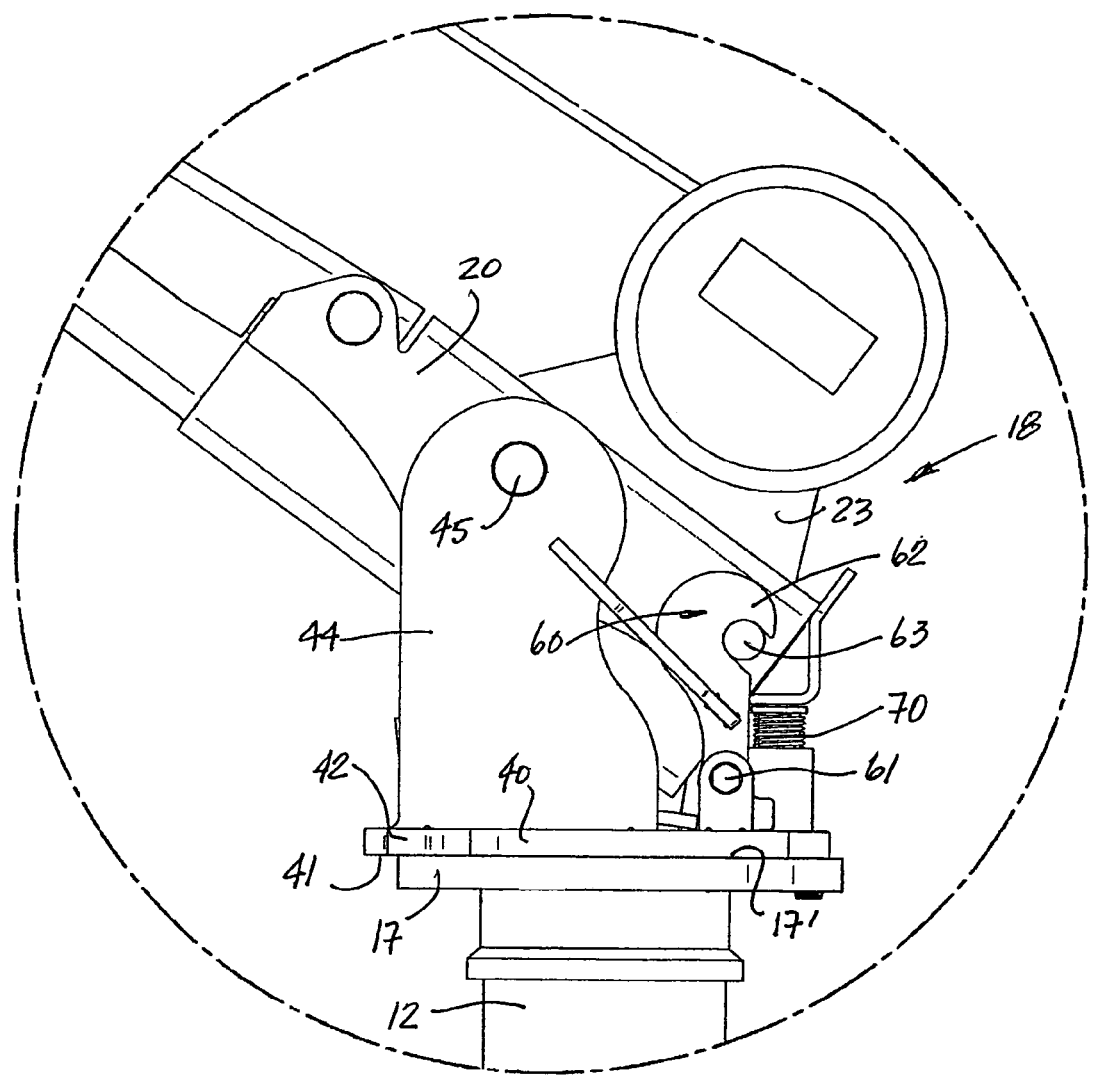
FIG. 2 is an enlarged side view of section A of FIG. 1, illustrating the construction of the boom support assembly connected to the upper end on the boom support column.
Figure 4:
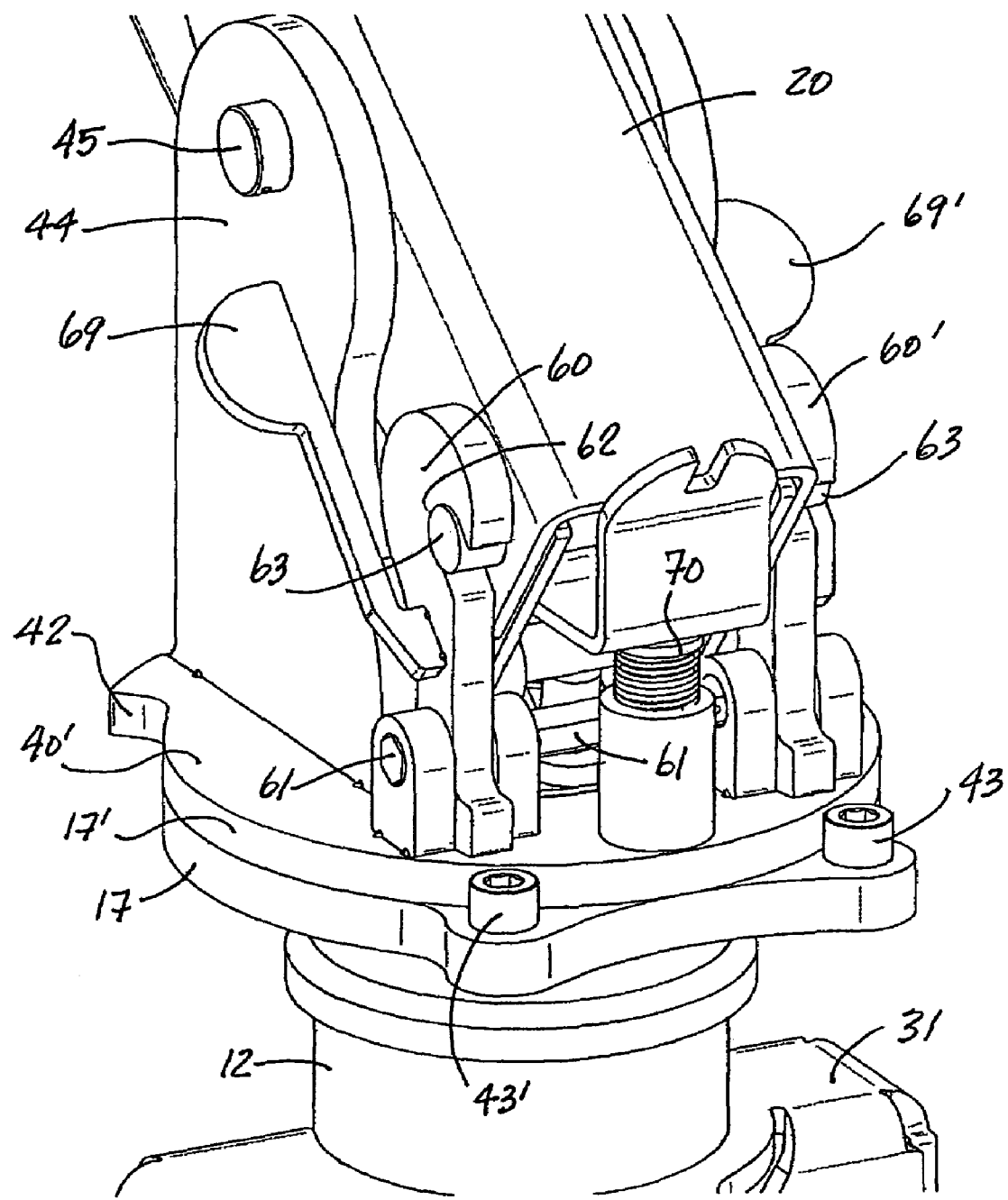
FIG. 4 is an enlarged perspective view of section B of FIG. 3, illustrating the boom support assembly and its connection to the boom support upper end of the support column.
Figure 5:
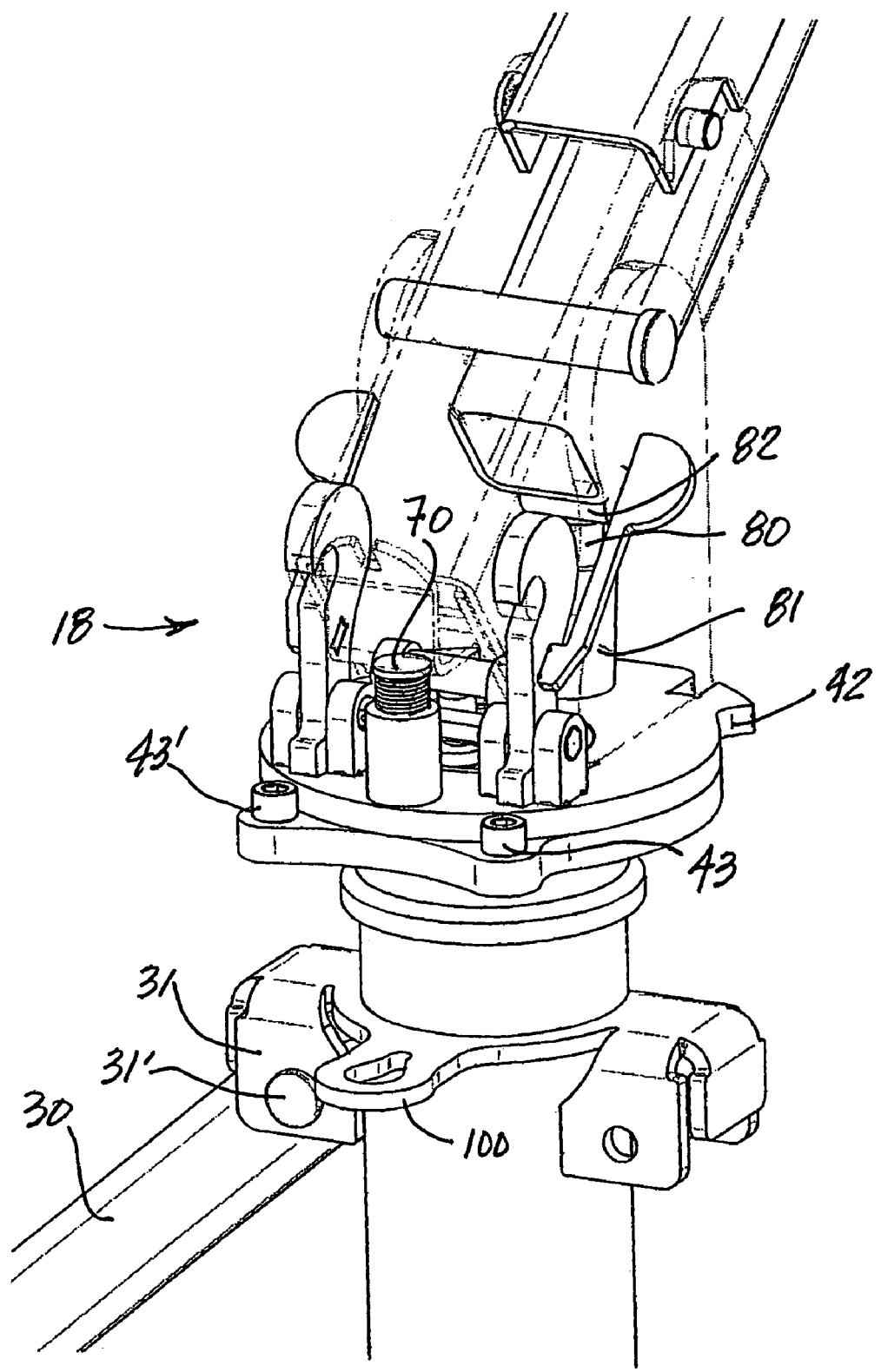
FIG. 5 is a fragmented perspective view illustrating the construction of the boom support assembly.
Figure 6A:
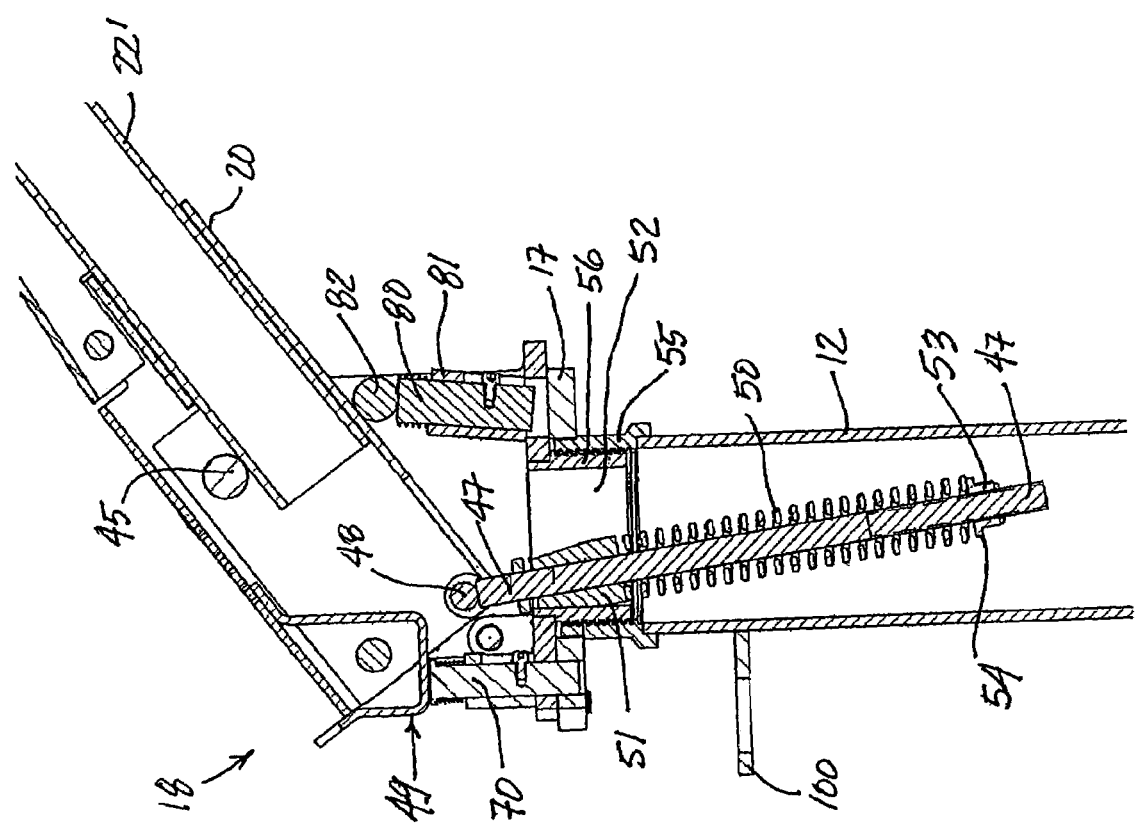
FIGS. 6A and 6B are further fragmented section view showing the interconnection of the boom support assembly with the boom support upper end in a boom elevated and horizontal position respectively.
Figure 6B:
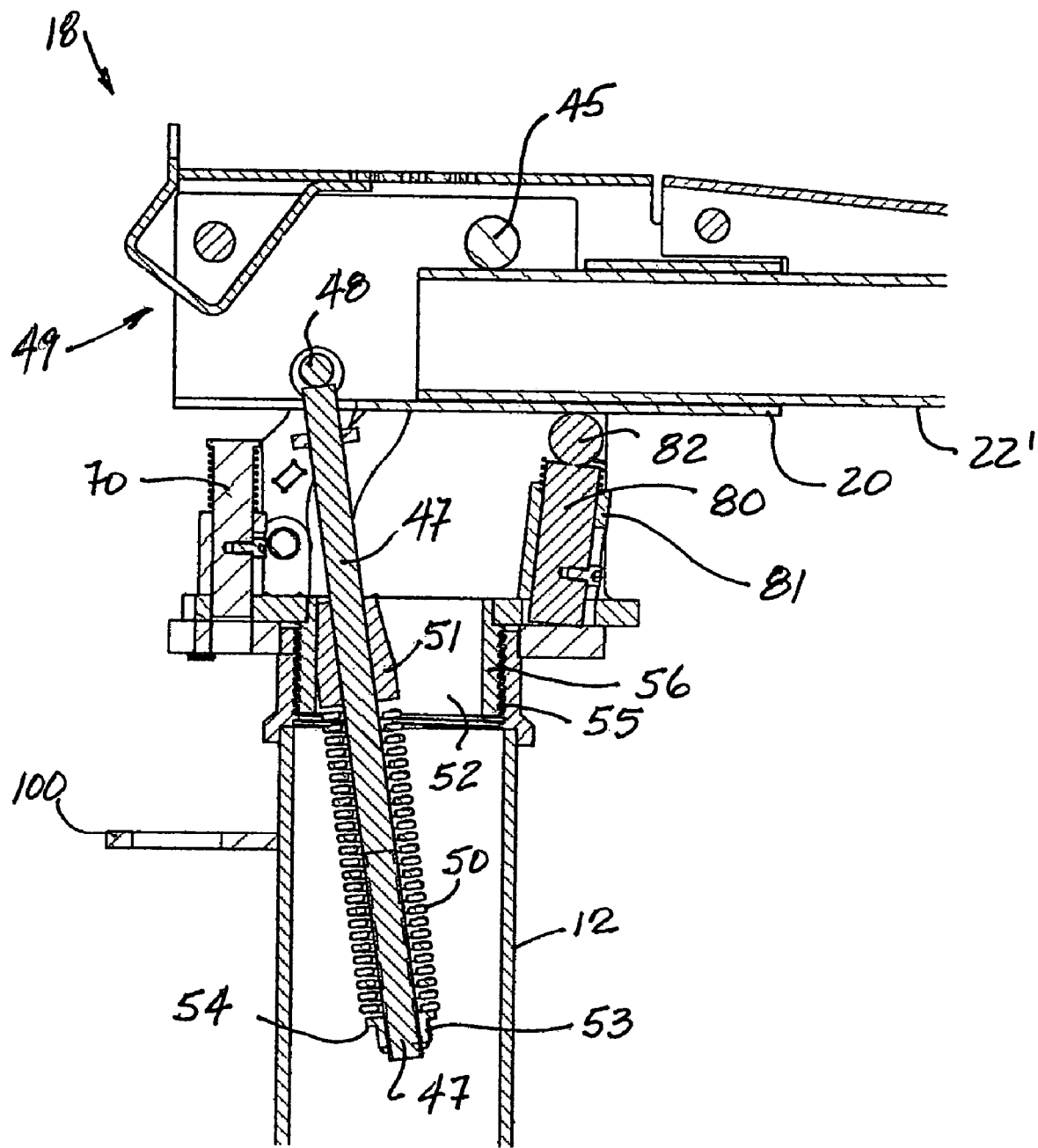

As also shown in FIGS. 6A and 6B the boom assembly connecting means of the boom support column is constituted by an inner threaded upper end 55 which is in threaded engagement with the outer threads 56 of the projecting connector 52 which is a connecting cylinder. In order to secure the boom support assembly 18 to the boom support upper end of the support column, this threaded cylinder connector. 52 is threaded in the upper end on the boom support column to provide for a strong engagement therewith. However, the threaded engagement is calculated such as to permit limited arcuate displacement of the flat connecting disc 40 with respect to the peripheral boom assembly connecting flange 17 whereby the boom support assembly 18 may be rotated along an arc which is delineated by opposed ones of the peripheral shoulders 42 and 42$^1$ as shown in FIGS. 2 and 4 and the pins 43 and 43$^1$.

When the boom is at its upward angular position, as shown in FIG. 1A, it is at a position to lift and object which has been pulled or placed thereunder and attached to the cable 27 and to displace that object 11 to a desired position such as for loading same on a trailer or other transport means. When the boom 21 is in that position, it is locked by a releasable locking means comprised by at least one hook member, herein two hook members 60 and 60$^1$, as shown in FIGS. 2 and 4, pivotally connected to a pivot pin 61 secured above the upper surface 40$^1$ of the connecting support disc 40. The hook members 60 and 60$^1$ have a hook end 62 for displaceable engagement with a lock pin 63 secured at the rear end 49 of the boom attaching cylinder 20 when the boom is placed at the upward angular position when the load tension is removed from the boom free end. These hook members and respective lock pins are disposed on a respective side of the boom attaching cylinder 20. Accordingly, when a load is lifted by the boom the boom will not bend as it is locked with the boom 21 through these hook members 60 and $60^1$.

When the boom is at its upward angular position, as shown in FIG. 1A, it is also important to lock the connecting support disc 40 of the boom assembly to the connecting flange 17 or the support column. To do this there is provided an arresting means in the form of a lock pin 70, as shown in FIG. 12, which is secured to the upper surface $40^1$ of the flat disc 40. This lock pin 70 extends in a cylinder 71 which has a through bore, herein shown in phantom lines 72, formed in the flat disc 40. The pin 70 is spring biased upwardly by a coil spring 73 retained captive between the cylinder and the pin 70. The coil spring 73 maintains the pin in an unlocked position wherein it does not protrude through the flat disc 40. This lock pin 70 is aligned with an abutment member 74 secured at the rear end 49 of the boom assembly. When the boom assembly is raised to its upward angular position or biased to that position, it applies pressure on the top abutment end 75 of the lock pin 70 to engage with the connector flange 17 as now described.

Figure 11:
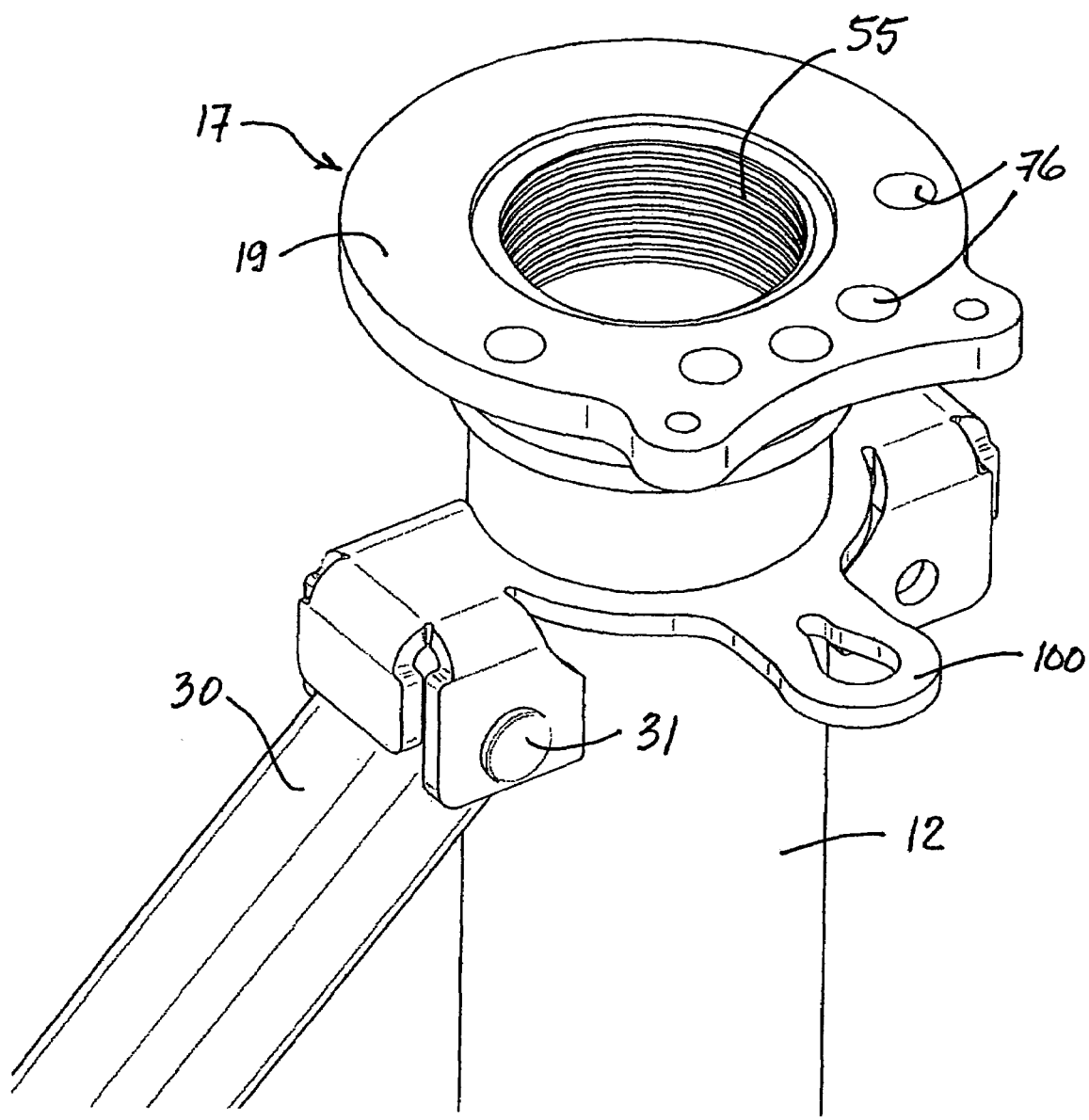
FIG. 11 is a fragmented perspective view showing the construction of the circumferential flange secured to the upper end of the support columns and the plurality of holes therein to interlock the boom support assembly at a desired angular position.

As shown in FIG. 11 the boom assembly connecting flange 17 is provided with a plurality of spaced holes 76 formed therethrough at predetermined locations whereby to receive a locking lower end of the lock pin 70 in close fit therein when in alignment with the boom biased upward to its angular position, as shown in FIG. 1, exerting a downward biasing force against the lock pin. Accordingly, once a retrieved load is positioned under the pulley 25 of the boom, tension is released from the cable 27 whereby the boom is urged to its upward position by the coil spring 50 on the biasing assembly and by rotating the boom, with a hand of an operator person, the flat disc 40 will rotate with respect to the connecting flange 17 and once the pin is positioned over one of the holes 76, it will automatically enter therein with the boom lifting to lock the boom at that desired position. If the boom needs to be displaced to another position, it is merely necessary for the operator to exert a downward pressure on the boom simply by pulling the boom with the hand thereby withdrawing the lock pin and further rotating the boom until it engages with another one of the holes 76. Once the boom is at a desired angular position then the winch 24 can be operated to pull the load upwards. Of course, before the boom can be lowered, it is necessary to disconnect the hook members 60 and this is done by applying a downward pressure on their actuating levers 69, as shown in FIG. 4, withdrawing the hook ends 62 from engagement with the lock pins 63.

When there is a need to pull a load, such as a log 11, as shown in FIG. 1A, which is at a remote location from the hoist 10, it is necessary to pull out the cable 27 and attach it to the log. The hook members 60 are then disconnected by pulling the lever 69 although this could be done before the cable is tied to the log and the winch is then actuated. The tension in the cable, due to its connection to the load spaced away from the boom, will apply a downward force on the pulley causing the boom assembly 21 to assume a substantially horizontal position as shown in FIG. 1B. When the boom assumes this horizontal position the lock pin 70 is pulled upward and is disconnected from its engagement with one of the holes 76 provided in the boom assembly connecting flange 17. The boom support assembly is thus free to rotate. However, in order to prevent any rotation once the boom reaches a pulling position there is provided a boom actuating brake means in the form of a spring biased brake pin 80 which is displaceably retained in a pin housing 81. The top end of the brake pin 80 has a transverse solid cylinder 82 welded thereto which abuts with a lower surface of the boom attaching cylinder 20. The pin housing 81 has a through bore extending through the connecting support wall or flat disc 40. This pin 80 is biased upwardly by a coil, not shown and spring located in the housing, to a disengaged position. As the boom assembly 21 is lowered to its retrieving position as shown in phantom lines at $21^1$, it applies a downward pressure on the brake pin to displace a braking lower end of the pin downwardly in the pin housing 81 and against the transverse support surface $17^1$ of the connecting flange 17 to prevent further rotational displacement between the boom assembly and the boom support column. Accordingly, the boom will not sway when the load is pulled on a ground surface by the cable.

Figure 8:
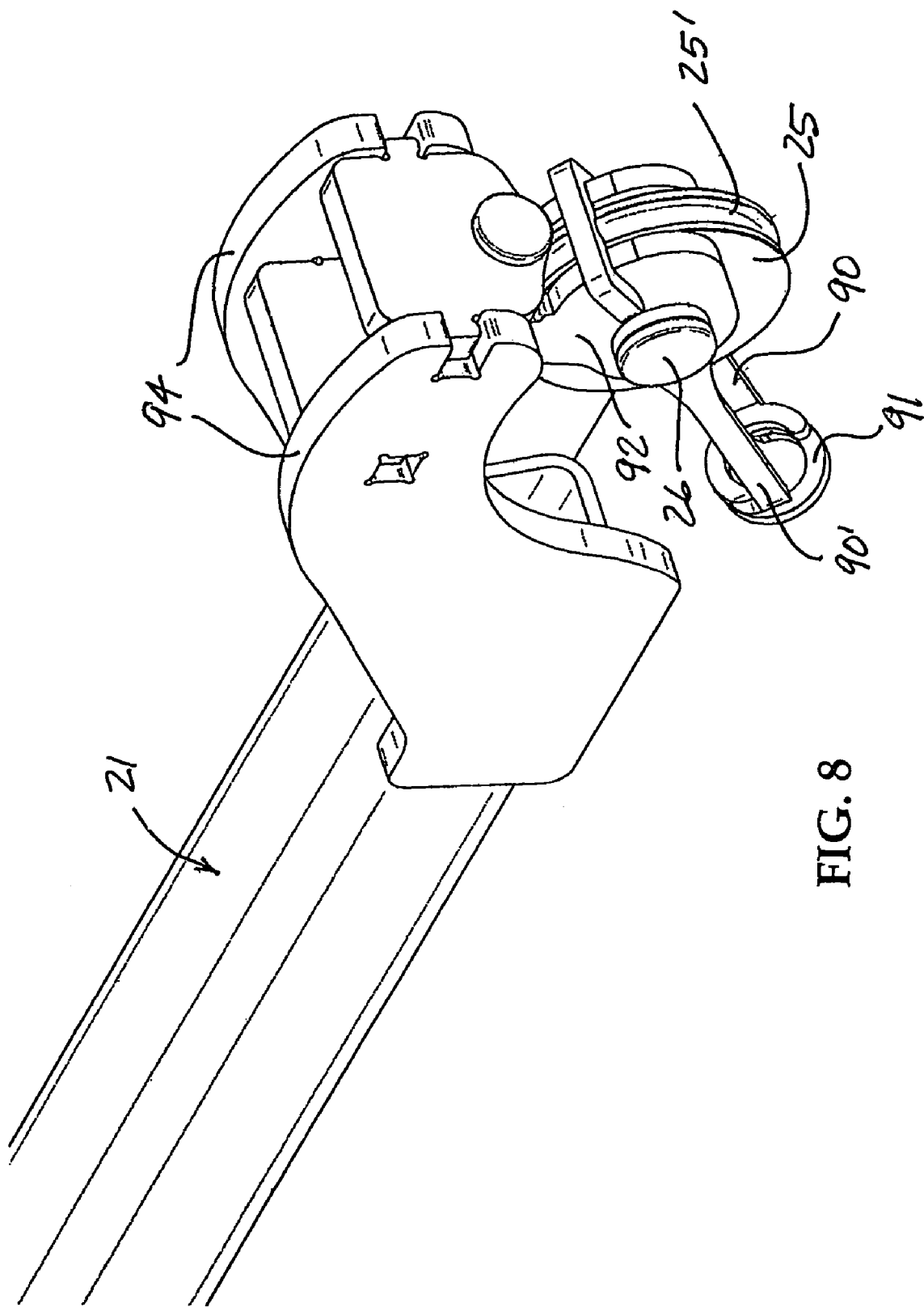
FIG. 8 is a fragmented perspective view showing the construction of the pulley assembly secured to the free end of the boom.
Figure 9:
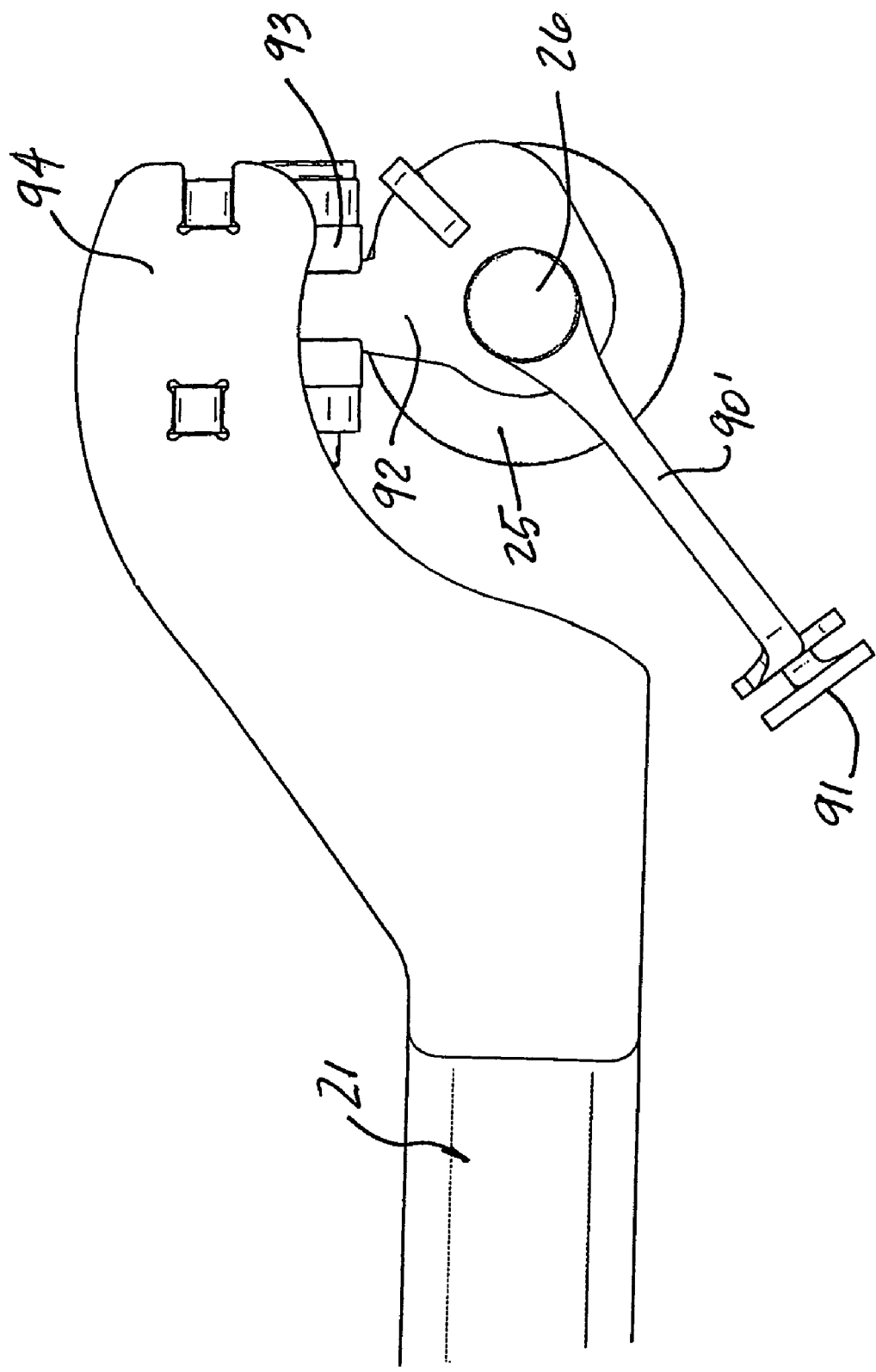
FIG. 9 is a side view of FIG. 8.
Figure 10:
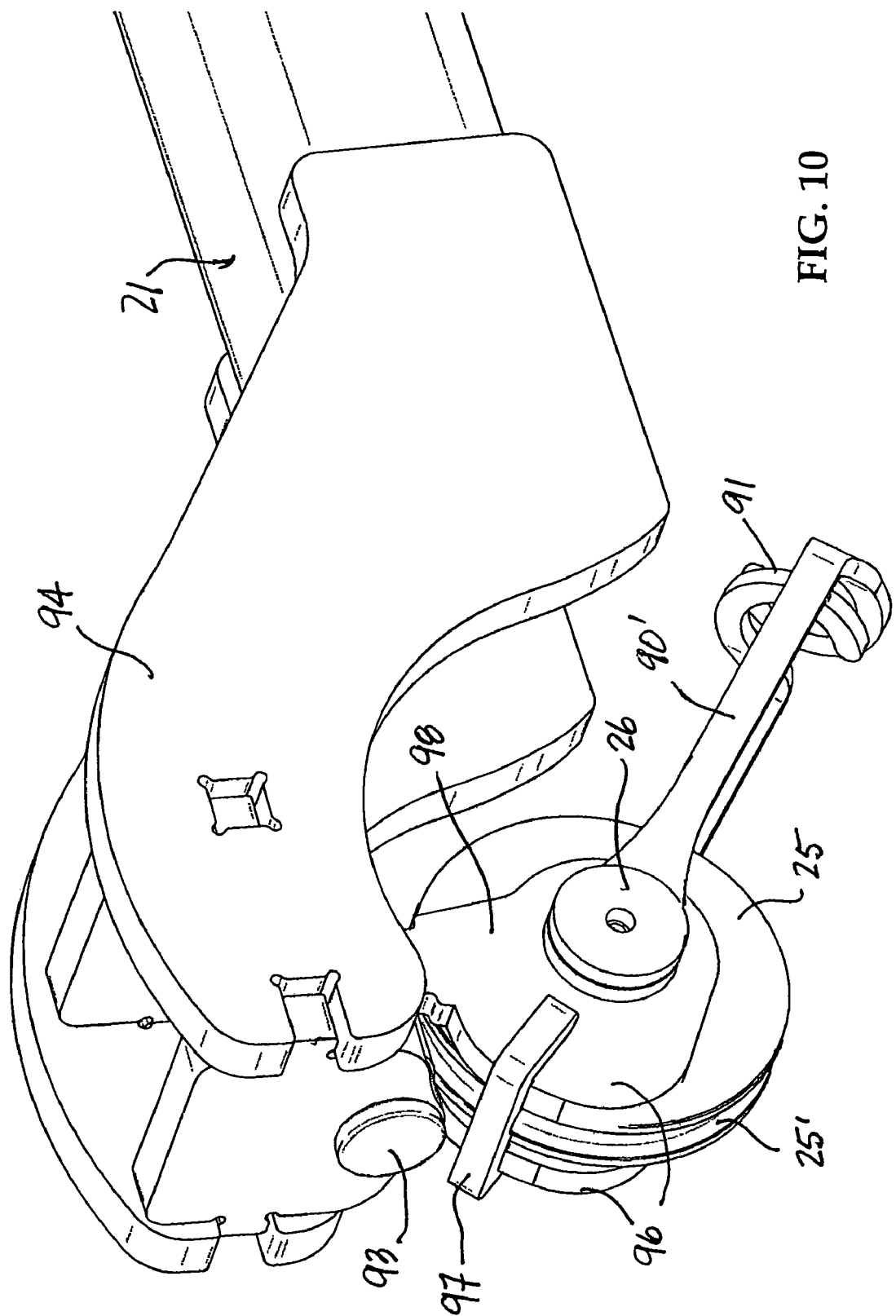
FIG. 10 is a perspective view showing a modification of the pulley assembly wherein a cable restraining U-shaped flange is provided to restrain the cable about the pulley.

Referring now to FIGS. 8 to 10 there will be described the construction of the pulley assembly. As herein shown the cable guide member 28 is constituted by a pair of parallel rod-shaped arms 90 and $90^1$ pivotally connected to the axle 26 on the respective side of the pulley 25. A cable guide aperture 91 is formed by a wire loop secured between the free ends of the parallel rod-shaped arms 90 and through which the cable extends. This wire loop is aligned centrally with the trough $25^1$ of the pulley 25. The pulley 25 is also supported by a pair of depending support arms 92 pivotally secured to a pivot rod 93 secured axially with the boom between a pair of attachment flanges 94 and this permits lateral displacement of the pulley, in a side to side motion with respect to the free end $21^1$ of the boom.

As shown in FIG. 10 the guide means further comprises cable restraining means in the form of an inverted U-shaped guide bracket 95 having depending side guide arms 96.which are closely spaced to opposed side walls of the pulley 25. This U-shaped guide member is not illustrated in FIGS. 8 and 9 for the purpose of clarity. These side guide arms 96 are interconnected by a connecting top wall 97 which is arcuately shaped and closely space above the trough $25^1$ of the pulley 25 to retain the cable captive between the arcuately shaped top wall and the trough. The inverted U-shaped guide bracket 95 is further provided with a top connecting loop end 98 which is also secured about the pivot rod 93.

As shown in FIGS. 1A, iB, 2 and 11 a connecting ring 100 is welded to an upper portion of the boom support column at a position substantially opposite to the brake pin 80 whereby to secure an attachment cable (not shown) thereto and to an immovable element (not shown) such as a tree or a heavy structure such as a vehicle in the vicinity of the hoist whereby to counteract for the weight of the load being retrieved by the boom.

It can be appreciated that the hoist of the present invention is for retrieving, lifting and positioning small loads, such as logs or any other object which has a maximum weight of about 1000 lbs. It is designed for ease of transport and to be attached to small vehicles such as pick-up trucks, tractors or all terrain vehicles or even to the chassis of a trailer. The boom can be assembled and disassembled quickly and can be operated by a single person. It is constructed with boom sections capable of being carried by a person and provides a compact transportable package. The boom is also provided with various safety features to maintain the boom in locked position when retrieving or lifting loads. The cable is also guided about the pulley with guide means to prevent the cable from jumping the pulley and the pulley can pivot laterally as well as the cable guide pivotal linkage whereby loads can be pulled from various directions with respect to the boom. The operator also does not have to exert any excessive force in order to displace the boom as the locking features thereof are performed automatically by the position of the boom or the boom support assembly.

It is within the ambit of the present invention to cover any obvious modifications over the preferred embodiments described herein, provided such modifications fall within the scope of the appended claims.

We claim:

1. A hoist for retrieving, lifting and positioning a load, said hoist comprising a boom support column having an attaching lower end and a boom support upper end, said boom support upper end having a boom assembly connecting means and a transverse support surface, a boom support assembly having a connecting support wall and a lower projecting connector for rotational connection with said connecting means with said connecting support wall in registry with said transverse support surface, a boom pivotally secured to said connecting support wall, biasing means for maintaining said boom at an upward angular position, releasable locking means to lock said boom at said upward angular position, boom actuating brake means to arrest rotational displacement between said connecting support wall and said transverse support surface when said boom is at a substantially horizontal load retrieving position, a pulley rotatably secured to an axle secured at a free end of said boom, said pulley being adapted to guide a cable thereon, cable guide means to align and maintain said cable on said pulley, said axle being connected to a lateral pivot support.

2. A hoist as claimed in claim 1 wherein there is further provided arresting means to interconnect said connecting support wall with said transverse support surface with said boom displaced to a selected desired position.

3. A hoist as claimed in claim 2 wherein said boom assembly connecting means is a cylindrical upper end of said boom support column provided with an inner threaded upper portion, said transverse support surface being constituted by a flange secured about an upper end of said cylindrical upper end and having a flat top surface.

4. A hoist as claimed, in claim 3 wherein said lower projecting connector is a threaded cylinder secured to and depending from said connecting support wall for threaded engagement with said inner threaded upper portion of said boom support column.

5. A hoist as claimed in claim 4 wherein said connecting support wall is a flat disc having a bottom flat surface and integrally formed peripheral shoulders for abutment with limit pins projecting above said flat top surface of said flange whereby to limit arcuate displacement of said boom assembly within an angular range with respect to said boom support column.

6. A hoist as claimed in claim 2 wherein said boom actuating brake means is provided by a spring biased brake pin displaceably retained in a pin housing projecting above said connecting support wall and aligned forwardly thereon under said boom, said housing having a through bore extending through said connecting support wall, said brake pin being biased upwardly to a disengaged position, said boom when lowered to said retrieving position applying downward pressure on said brake pin to displace a breaking lower end of said pin downwardly in said pin housing and against said transverse support surface of said boom support upper end to prevent rotational displacement between said boom assembly and said boom support column.

7. A hoist as claimed in claim 6 wherein there is further provided a connecting ring secured to an upper portion of said boom support column substantially opposite to said brake means whereby to secure a cable thereto and to an immovable element whereby to counteract against a load to be retrieved by said boom.

8. A hoist as claimed in claim 2 wherein said boom is pivotally secured between a pair of flanges projecting above said connecting support wall on a boom pivot pin, said biasing means being constituted by a connecting rod pivotally connected to rear end of said boom rearwardly spaced from said boom pivot pin, a coil spring retained in compression about said connecting rod between an arresting cylinder and an adjustable threaded nut engaged about a lower threaded end of said connecting rod to exert a pulling force on said boom to maintain same at said upward angular position.

9. A hoist as claimed in claim 8 wherein said boom is lowered on said pivot pin by a surface load attached to said cable and exerting a downward pulling force on said pulley when a pulling force is applied to said cable by a winch, said boom when lowered exerting a compressive force on said coil spring whereby to spring load said coil spring to restore said boom to said upward angular position when said winch releases said pulling force and tension in said cable.

10. A hoist as claimed in claim 2 wherein said releasable locking means is comprised by at least one hook member pivotally connected on an upper surface of said connecting support wall, said hook member having a hook end for displaceable engagement with a lock pin secured at a rear end of said boom when said boom is at said upward angular position.

11. A hoist as claimed in claim 10 wherein there are two of said hook members disposed on a respective side of said boom rear end and engageable with a respective one of two of said lock pins secured to a respective side of said boom rear end.

12. A hoist as claimed in claim 10 wherein said arresting means is provided by a lock pin secured to said upper surface of said connecting support wall and extending in a through bore of said connecting support wall, a coil spring about said lock pin to maintain said pin in an unlocked position when said boom is at said retrieving position, said lock pin being aligned with an abutment member of said boom at said rear end thereof, said transverse support surface at said boom support upper end having a plurality of spaced holes therein for receiving a locking lower end of said lock pin in close fit therein when said boom is free to move to said upward angular position exerting a downward biasing force against said lock pin and said lock pin positioned for registry with a selected one of said holes.

13. A hoist as claimed in claim 2 wherein said cable guide means is comprised of a pivotal link pivotally connected to said axle at one end and projecting forwardly of said pulley, a cable guide aperture at a free end of said pivotal link for guide passage of said cable therethrough to maintain said cable aligned with a circumferential guide through of said pulley.

14. A hoist as claimed in claim 13 wherein said lateral pivot support comprises a pair of support arms pivotally secured to permit lateral pivotal displacement of said pulley with respect to said free end of said boom.

15. A hoist as claimed in claim 14 wherein said cable guide means further comprises cable restraining means secured to said support arms and projecting over a forward top end of said pulley to retain said cable captive in a cable dispensing portion of said guide through.

16. A hoist as claimed in claim 15 wherein said restraining means is comprised by an inverted U-shaped guide having depending side guide arms and a connecting top wall, said side guide arms being closely spaced to opposed side walls of said pulley, said connecting top wall being arcuately shaped and closely spaced above said through to retain said cable captive between said arcuately shaped top wall and said through.

17. A hoist as claimed in claim 13 wherein said pivotal link is comprised by a pair of parallel rod-shaped arms pivotally connected to said axle on a respective side of said pulley, said cable guide aperture being formed by a wire loop secured between free ends of said parallel rod-shaped arms.

18. A hoist as claimed in claim 2 wherein said attaching lower end comprises an attachment flange adapted to receive fasteners to secure said flange to a stationary support member.

19. A hoist as claimed in claim 2 wherein there is further provided a telescopic bracing leg pivotally connected to said boom support column, said bracing leg having a telescoping lower tubular portion provided with incremental connecting formations, a lever actuated arresting locking member for locking engagement with a selected one of said connecting formations, and a ground engaging foot plate hingedly connected at a lower end of said lower tubular portion.

20. A hoist as claimed in claim 1 wherein said boom is formed in interconnectable sections for ease of assembly and transport, said hoist being adapted for the retrieval and lifting of loads in the range of up to about 1000 lbs.

* * * * *